Patented Dec. 25, 1945

2,391,613

UNITED STATES PATENT OFFICE 2,391;613

PROCESS OF COLORING WOOD

Crayton K. Black, Wilmington, Del., assignor to E. I. du Pont de Nemours & Company, Wilmington, Del., a corporation of Delaware No Drawing. Application June 15, 1943, Serial No. 490,875

2 Claims. (Cl. 8—6.5)

This invention relates to the coloring of wood by pigmentation and to the wood so colored.

From the very earliest times stains have been applied to wood to color it and to bring out the grain. These stains have frequently been spirit-soluble dyes which, when applied to the surface, penetrated enough to give the wood a superficial staining. Penetration with stains is very slight and the wood cannot be worked after staining without removing the stain. The dyes used in stains are fugitive to light and are not fast to water. In order to improve the penetration, dyes have been applied to wood in solution under pressure. This has given an increased penetration but has not altered the inherent weakness of the colors. Attempts to dye wood by whatever method have been greatly handicapped because wood is not a homogeneous material, but is heterogeneous. The supporting structure of wood is alpha cellulose, but there are also present quantities of other celluloses, lignin and sap. Some woods exude gummy materials. Not only does the composition of wood differ from wood to wood, but it differs from tree to tree in the same species. Because of this dyes take with varying effect in different pieces of wood.

It is an object of this invention to color wood by a method which overcomes the objections of the prior art so that wood may be colored and worked after coloring, so that it may be colored evenly and to a great depth compared with the depth which is reached by stains, and so that its fastness to light and water will be improved.

The objects of this invention are accomplished, generally speaking, by impregnating wood with the separated components of an azo pigment, and forming the pigment within the structure of the wood.

In the practice of my invention I prefer to use a solution containing a stabilized diazo and a coupling component, each of which is free from water-solubilizing groups. The diazo may be the diazo salt of any primary arylamine free from water-solubilizing groups, such as carboxy, sulfonic and sulfonamide. The coupling components may be any water-insoluble component used in the making of azo pigments; they are in general hydoxy or amino aryl compounds or arylides of acetoacetic acid. Numerous examples and types of these components will occur to persons skilled in the art. The particular examples which are given herein are merely illustrative.

We carry out the impregnation preferably within the temperature limits of 63–93° C. Below 60° C. there is a tendency to get spotty and imperfect penetration. Above 104° C. there is a tendency to produce tarry materials from the dye components. The diazo is reacted with a stabilizer before being mixed with the coupling component, and the solution of the two is kept alkaline to prevent the regeneration of the diazo until the impregnation has been completed. The alkalinity of this impregnating composition has been maintained at 11.4 pH without harming the wood, under the temperature and conditions of treatment, but so high an alkalinity should not be too long maintained. After the wood has been impregnated with the stabilized diazo and the coupling components, it is impregnated with acid. A pH of 2.65 has been found adequate. The fundamental requirement is that enough acid shall be forced into the wood to regenerate the diazo and form the pigment. The wood may be left either neutral or slightly acid.

The impregnation is preferably carried out by bleeding air from the wood under vacuum and then impregnating it with the pigment components under pressure. Pressure alone without vacuum has been sufficiently successful to secure uniform impregnations from a depth of a half inch to an inch depending upon the piece of wood treated. Impregnation can be carried out under nitrogen gas pressure, under air pressure or under liquid pressure.

In the following examples parts are by weight, except when otherwise indicated, and the elements are illustrative, not limiting.

Example I

Paste in 15 parts denatured alcohol, 16 parts of a mixture of (1) one mole of the diazoamino compound from diazotized 4-chloro-2-aminoanisole and sodium pipecolinate and (2) one and five hundredth moles of the p-phenetidide of acetoacetic acid. Add 15 parts of 35% sodium hydroxide solution. Stir well and make volume to 2,000 parts with water at 38° C. Stir to complete solution.

Immerse 60 parts of white pine in the above solution in an autoclave and hold the temperature at 70° C. for two hours at a pressure of 300 lbs. per square inch gauge produced with nitrogen gas.

After cooling, remove the remaining solution and immerse the wood in the following solution:

| | Parts |
|---|---|
| Water | 2000 |
| Glacial acetic acid | 22.4 |
| Formic acid | 10 |
| Sodium sulfate | 50 |

Subject the wood to a temperature of 70° C. and a pressure of 300 lbs. per square inch with nitrogen for two hours.

After the wood has been removed and dried, it is found to be colored a bright yellow, which color is penetrated for a distance of ½ to ¾ inch in the wood. When exposed out of doors for one month at an angle of 45° south the color is faded only slightly. In this respect it is much superior to wood stained with typical spirit or oil stain. The wood can be planed down to a smooth surface without change in color.

The following color producing combinations were substituted for the one used in the above formula:

Example II

Diazoamino compound from diazotized aniline and methyl glucamine mixed with the o-toluidide of 2-hydroxy-3-naphthoic acid. A bright orange color was obtained.

Example III

Diazoamino compound from diazotized 4-chlor-2-amino-toluene and sodium pipecolinate mixed with the o-toluidide of 2-hydroxy-3-naphthoic acid. A bright red color was obtained.

Example IV

Diazoamino compound from diazotized 2-methoxy-5-methyl aniline and methyl glucamine mixed with 3-nitro-anilide of 2-hydroxy-3-naphthoic acid. A deep bordeaux color was obtained.

Example V

Diazoamino compound from diazotized 4-chlor-2-amino-toluene and sodium pipecolinate mixed with the o-phenetidide of 2-hydroxy-3-naphthoic acid. A bright red color was obtained.

Example VI

Tetrazoamino compound from tetrazotized o-dianisidine and methyl glucamine mixed with the anilide of 2-hydroxy-3-naphthoic acid. A blue color was obtained.

Example VII

Tetrazoamino compound from tetrazotized o-dianisidine and methyl glucamine, mixed with 4-(3-nitro-phenyl-azo)-1-acetylamine-7-naphthol. A black color was obtained.

Example VIII

Diazoamino compound from diazotized 4-chlor-2-amino-toluene and sarcosine mixed with the o-toluidide of 2-hydroxy-3-naphthoic acid. A red color was obtained.

Example IX

Tetrazoamino compound from tetrazotized o-dianisidine and proline mixed with the anilide of 2-hydroxy-3-naphthoic acid. A blue color was obtained.

By means of this invention it is possible to impregnate wood with a pigment of any desired color. Such wood can be planed, sawed, etc. and still present a uniformly colored surface. The fastness of these colored woods to light and water is greatly superior to that of the same wood dyed by the water-soluble dyes used for staining. My pigmenting process permits the grain of the wood to show, which in many cases is an advantage over a painted surface, because it is decorative and will not peel, chip or crack off.

My invention has many other advantages over stains, among which are the evenness of color and depth of penetration. In my invention the color of the wood does not arise from its dyed parts but from the color of the inlaid pigment, so woods of different kinds show less variation in color than those dyed with stains.

As many apparently widely different embodiments of this invention may be made without departing from the spirit and scope thereof, it is to be understood that I do not limit myself to the specific embodiments thereof except as defined in the appended claims.

I claim:

1. The process of coloring an object of wood throughout interior portions thereof which comprises immersing the object in an alkaline solution having a pH value not higher than about 11.4 and containing a stabilized diazotized arylamine and an azo pigment coupling component, said amine and said coupling component being devoid of solubilizing groups and said solution being heated to a temperature between about 63° C. and about 93° C., applying pressure to said liquid until the interior portions of the wood are impregnated with the solution, and thereafter impregnating the interior portions of the wood with an acid until the diazotized arylamine therein is regenerated and a colored substance is formed.

2. The process of coloring an object of wood throughout interior portions thereof which comprises immersing the object in an alkaline solution having a pH value not higher than about 11.4 and containing a stabilized diazotized arylamine and an azo pigment coupling component, said amine and said coupling component being devoid of solubilizing groups and said solution being heated to a temperature higher than about 63° C. and below that which decomposes the said dye forming constituents, applying a pressure above atmospheric which is sufficient to impregnate the wood throughout with said solution, and thereafter acidifying the interior portions of the wood.

CRAYTON K. BLACK.